No. 755,394. PATENTED MAR. 22, 1904.
J. H. SCAIFE.
AUGER.
APPLICATION FILED NOV. 30, 1903.
NO MODEL

Witnesses
Willis Rockwell

Inventor
J. H. Scaife
By H. R. Wilson
Attorney

No. 755,394. Patented March 22, 1904.

UNITED STATES PATENT OFFICE.

JEFFERSON H. SCAIFE, OF CAMILLA, GEORGIA.

AUGER.

SPECIFICATION forming part of Letters Patent No. 755,394, dated March 22, 1904.

Application filed November 30, 1903. Serial No. 183,171. (No model.)

*To all whom it may concern:*

Be it known that I, JEFFERSON H. SCAIFE, a citizen of the United States, residing at Camilla, in the county of Mitchell and State of Georgia, have invented certain new and useful Improvements in Augers; and I do declare the following to be a full, clear, and exact description of the invention, such as will enable others skilled in the art to which it appertains to make and use the same.

This invention relates to improvements in gage attachment for augers, and is more especially designed for augers used in cutting tenons.

The object of the invention is to provide an attachment of this character which may be adjusted to cut tenons of various depths.

A further object is to provide a combined auger and gage which will be simple, strong, efficient, and inexpensive.

With these and other objects in view the invention consists of certain novel features of construction, combination, and arrangement of parts, as will be more fully described, and particularly pointed out in the appended claim.

Figure 1:
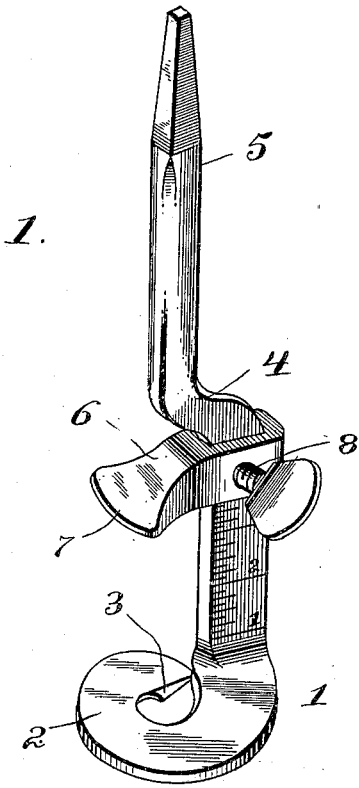
Figure 2:
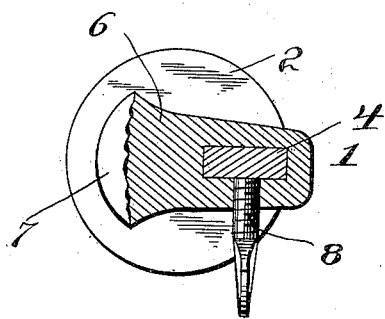

In the accompanying drawings, Figure 1 is a perspective view of an auger embodying the invention. Fig. 2 is a horizontal sectional view through the gage and auger-stem.

Referring to the drawings more particularly, 1 denotes the auger, which is constructed substantially as shown, having a flat annular spiral cutting-head 2, which is formed on its end with a cutting edge or blade 3. The cutting-head 2 is provided at its upper end with an upwardly-projecting stem 4, which is of flat rectangular shape. The upper portion or tang 5 of the stem is concentric with the cutting-head. Its lower portion is offset and eccentric thereto, as shown. On the said offset portion of the stem is a gage 6, which is slidable thereon and has a laterally-extending stop 7, which extends over the center of the cutting-head. The gage 6 is provided with a set-screw 8, which passes through one side of the same and impinges against the side of the stem 4, so that by loosening the screw the gage may be adjusted to any desired position.

On the side of the stem 4 is arranged a scale by which the operator may adjust the gage and determine the depth to which the tenon is to be cut.

In operation when it is desired to cut a tenon of a certain depth the gage is adjusted to the proper scale-mark and locked by the set-screw 8. The auger is now applied to the end of the spoke or other place where it is desired to cut the tenon. When the tenon has been cut to the required depth, the end of the same will abut against the stop 7, which will prevent the auger from cutting any deeper, thus forming the tenon of the desired length. The rectangular shape of the stem 4 prevents any possibility of the gage turning on the same, the stop 7 being thereby always held above the center of the cutting-head.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

An auger having its cutting-head provided at its upper end with a stem, the outer portion of which is concentric with the cutting-head and the inner portion of which is laterally offset and eccentric to the cutting-head, and a gage slidable on said laterally-offset, eccentric portion of the stem, extending over the center of the cutting-head and having means to secure it to the said laterally-offset portion of the stem.

In testimony whereof I have hereunto set my hand in presence of two subscribing witnesses.

JEFFERSON H. SCAIFE.

Witnesses:
J. HARRY POWELL,
W. L. SCAIFE.